United States Patent
Zhou et al.

(10) Patent No.: US 12,327,296 B2
(45) Date of Patent: Jun. 10, 2025

(54) CACHE-BASED WARP ENGINE

(71) Applicant: Black Sesame International Holding Limited, San Jose, CA (US)

(72) Inventors: Ying Zhou, Cupertino, CA (US); Hui Wang, Sunnyvale, CA (US); Jingyuan Li, Guangzhou (CN); Yanfang Huang, Shanghai (CN)

(73) Assignee: BLACK SESAME TECHNOLOGIES INC., San Jose, CA (US)

( * ) Notice: Subject to any disclaimer, the term of this patent is extended or adjusted under 35 U.S.C. 154(b) by 536 days.

(21) Appl. No.: 17/381,873

(22) Filed: Jul. 21, 2021

(65) Prior Publication Data
US 2023/0022878 A1 Jan. 26, 2023

(51) Int. Cl.
*G06T 1/60* (2006.01)
*G06T 3/18* (2024.01)
*G06T 3/4007* (2024.01)

(52) U.S. Cl.
CPC .................. *G06T 1/60* (2013.01); *G06T 3/18* (2024.01); *G06T 3/4007* (2013.01)

(58) Field of Classification Search
CPC ....................................................... G06T 1/60
See application file for complete search history.

(56) References Cited

U.S. PATENT DOCUMENTS

| | | | | |
|---|---|---|---|---|
| 6,088,045 A * | 7/2000 | Lumelsky | ............... | G09G 5/026 345/545 |
| 2003/0122960 A1* | 7/2003 | Lafon | ................... | G06T 3/4023 348/581 |
| 2004/0008327 A1 | 1/2004 | Silverbrook | | |
| 2004/0141211 A1* | 7/2004 | Furukawa | ............... | H04N 1/387 358/537 |
| 2005/0092849 A1* | 5/2005 | Silverbrook | ........... | B41J 2/1637 235/494 |
| 2005/0259739 A1* | 11/2005 | Nakamura | ............... | H04N 5/145 348/E7.013 |
| 2008/0165253 A9* | 7/2008 | Silverbrook | ......... | H04N 5/2628 348/E5.055 |
| 2008/0170051 A1* | 7/2008 | Zhan | ...................... | G09G 5/366 345/204 |
| 2008/0259217 A1* | 10/2008 | Den Breejen | ............ | H04N 5/20 348/E5.073 |

(Continued)

FOREIGN PATENT DOCUMENTS

| CN | 1558828 A | 12/2004 |
|---|---|---|
| CN | 107220925 A | 9/2017 |
| KR | 101540300 B1 | 8/2015 |

*Primary Examiner* — Edward Park (74) *Attorney, Agent, or Firm* — Timothy T. Wang; Ni, Wang & Massand, PLLC (57) ABSTRACT

The present invention relates to an image warping system capable of quickly performing image warping with low costs by using a cache memory, and a method thereof. The image warping system is provided to generate a transformed image by warping an input image with the help of a cache based WARP engine. The WARP engine accesses the input image and loads a portion of the image to the cache memory for speeding up the engine process. The WARP engine performs interpolation on the input image to generate an output image which is devoid of distortions. The output image obtained is then stored in the DDR of an electronic device.

14 Claims, 8 Drawing Sheets

(56) References Cited

U.S. PATENT DOCUMENTS

| | | |
|---|---|---|
| 2010/0310129 A1* | 12/2010 | Hopfner .................... G06T 7/13 |
| | | 382/104 |
| 2014/0258618 A1* | 9/2014 | Novakovsky ....... G06F 12/0802 |
| | | 711/118 |
| 2014/0341305 A1* | 11/2014 | Qu .......................... H04L 69/22 |
| | | 375/240.26 |
| 2015/0254818 A1 | 9/2015 | Li et al. |
| 2017/0206856 A1* | 7/2017 | Song ...................... G09G 5/363 |
| 2018/0032429 A1* | 2/2018 | Liu ...................... G06F 12/0871 |
| 2018/0103174 A1* | 4/2018 | Ito ............................ H04N 1/21 |
| 2023/0162332 A1* | 5/2023 | Yang ...................... G06T 19/20 |
| | | 348/241 |

* cited by examiner

CACHE-BASED WARP ENGINE

FIELD OF INVENTION

The present invention relates to an image warping system using a cache memory and a method thereof. More particularly, the present invention relates to an image warping system and a method capable of performing image warping at a low cost using a cache memory.

BACKGROUND OF THE INVENTION

Image warping refers to transforming the geometric shape of the original image by re-sampling the original image according to certain rules. As an example, it is exemplified that the lens distortion of the photographed image is corrected to generate an image in which the lens distortion is corrected. Image warping can also be used for image correction for matching stereo images or for composing panoramic images by compositing multiple images.

Image warping is performed through a process of pixel coordinate conversion between the original image and the deformed image. The transformation rule between the coordinates (x, of the pixel of the deformed image can be represented by a predetermined mapping function. There are many prior arts available that discuss warping techniques.

One of the many prior arts disclosing image warping techniques is a U.S. Pat. No. 6,756,993B2 assigned to University of North Carolina at Chapel Hill that discloses the technique of image warping. The invention provides methods and apparatus for rendering images, and more particularly to methods and apparatus for rendering images using 3D warping techniques. The patent deals with the method of interpolating an image bi-linearly to generate an interpolated output image. The warping techniques disclosed remove distortions from the deformed image and produce a distortion-less image. However, the technology described is capable of only removing the distortions from the deformed image and fails to perform geometry transformations, panorama generation and blending of two images.

Another U.S. Pat. No. 8,649,558B2 assigned to Wisconsin Alumni Research Foundation relates to processing image data, and more specifically, to devices, systems and methods for warping video data. Video data is processed via resizing for each of a plurality of source video frames, to warp (e.g., resize) the video data for display. The patent overcomes the shortcomings of the above patent by introducing features such as geometry transformations, panorama generation and blending. However, the patent does not include a cache based warp engine to store an image for it to be used later. The image warping technique disclosed thus becomes an expensive technique and a time-taking one.

To overcome the limitations of the patent mentioned above, a KR patent 101540300B1 was assigned to Robot Co. Ltd. relating to an image warping system using a cache memory and a method thereof. However, the technology disclosed supports just one kind of image format and performs only distortion correction.

Thus, to overcome the disadvantages of the prior arts mentioned, a cache based WARP engine has been disclosed that performs distortion correction, panorama generation and perspective correction on an input image. Moreover, the cache based WARP engine utilizes very little cache memory for speeding up the engine process reducing the cost of warping significantly.

It is apparent now that numerous methods and systems are developed in the prior art that are adequate for various purposes. Furthermore, even though these inventions may be suitable for the specific purposes to which they address, accordingly, they would not be suitable for the purposes of the present invention as heretofore described.

SUMMARY OF THE INVENTION

It is an object of the present invention to provide an image warping system capable of quickly performing image warping at low cost by utilizing a cache memory. Embodiments of the present invention provide solutions to the foregoing and other problems in the art with systems and methods for warping panoramic images using a cache based WARP engine. In particular, the disclosed system and method generate an enhanced panoramic image without regard to image content by warping a panoramic digital image having skewed boundaries to fit a predetermined shape using a cache based WARP engine that is capable of supporting multiple image formats.

The primary objective of the invention is to provide a cache based WARP engine that performs image distortion correction, geometry transformations, panorama generation and blending of two or images together. The cache based WARP engine decreases the DDR access times and DDR bandwidth requirement along with decreasing the local SRAM requirement. Further, the engine unifies multiple image format processing speed, making the engine processing speed independent of the image format. The different types of image formats supported by the WARP based engine include RGB888, RGB888-planar, YUV422, NV12 and NV21 and YUV420 planar.

According to one aspect of the present invention there is provided an image warping system for generating a transformed image comprising a plurality of groups of pixels by warping an original image comprising a plurality of original image blocks. In the primary embodiment, the original image is stored in the DDR of an electronic device. The cache memory of the device is implemented in an SRAM (Static RAM) to store an input image data for the cache based WARP engine to access. Cache memory is usually consisted of SRAM, which is more expensive but can provide much higher bandwidth compared to DDR. The input image is stored in DDR and only a part of the image data is loaded to the cache memory to speed up the engine process. The cache memory of the device is made up of multiple cache lines that store the input image data. The invention typically supports a 32 k bytes cache; however, the size of the cache memory is configurable. Further, the size of each cache line is configurable.

Another objective of the present invention is to provide a cache lookup table stored inside the cache memory for storing the order information of the original image blocks to be sequentially loaded into the cache memory. The cache lookup table consists of multiple coordinates that define information related to the input image. The coordinates for the output image include 2-bytes for X-coordinates and 2-bytes for Y-coordinates. The image warping system may use an image lookup table to perform image warping on the original image, thereby generating a warped image. The image lookup table may be a lookup table storing mapping information between pixels included in the transformed image and pixels included in the original image.

The cache based WARP engine of the invention would use the coordinates to map the input image to the output image. The coordinates for the output image are fixed, from left to right and from top to bottom. The engine would follow output sequence of the coordinates and look at the WARP table to determine which part of the input data engine should grab. The WARP Engine uses same cache lines and same cache size to support different image formats. The only difference between each image format support is bandwidth requirement, different image format requires different bandwidth to achieve same frame rate.

The WARP engine then performs a warping operation by interpolating the input image bi-linearly or bi-cubically based on the multiple coordinates of the input image. The cache based WARP engine supports both bi-linear and bi-cubic image interpolation techniques. Bi-cubic interpolation provides a better image quality as compared to the image quality achieved by bi-linear interpolation. A processor of the WARP engine calculates the output image by a raster scan method.

According to another aspect of the present invention there is provided an image warping system comprising a processor and a memory for storing a computer program executed by the processor, wherein the computer program, when executed by the processor. An image warping system is provided for causing the method described above to be performed.

Another objectives and aspects of the invention will become apparent from the following detailed description, taken in conjunction with the accompanying drawings, which illustrate, by way for example, the features in accordance with embodiments of the invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

Although, the invention is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

The presence of broadening words and phrases such as "one or more," "at least," "but not limited to" or other like phrases in some instances shall not be read to mean that the narrower case is intended or required in instances where such broadening phrases may be absent.

BRIEF DESCRIPTION OF THE FIGURES

The objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described and explained with additional specificity and detail through the use of the accompanying drawings in which:

DETAILED DESCRIPTION OF THE FIGURES

Content, such as visual content, may be captured as more images or video frames by one or more image capture devices, such as a camera. An image capture device includes one or more lenses, image sensors, image signal processors, encoders etc. A lens may receive and focus light on an image sensor. An image sensor may sample the light and generate an electronic image signal. An image signal processor (ISP) may receive the image signal from the image sensor and may process the image signal to generate an image, picture, or frame. The generated images may be stored, such as in a memory of an image capture device.

Some image capture devices use lenses (e.g., fish-eye or spherical lenses) that significantly distort captured images. An image signal processor may apply a warp transformation to correct lens distortion and other distortions associated with the capture of images with one or more image sensors (e.g., electronic rolling shutter correction, binocular disparity correction, image stitching, electronic image stabilization, etc.) Because some of these distortions can be significant, the warp transformation to correct them may significantly move portions (e.g., pixels or blocks of pixels) within the image(s).

Figure 1:
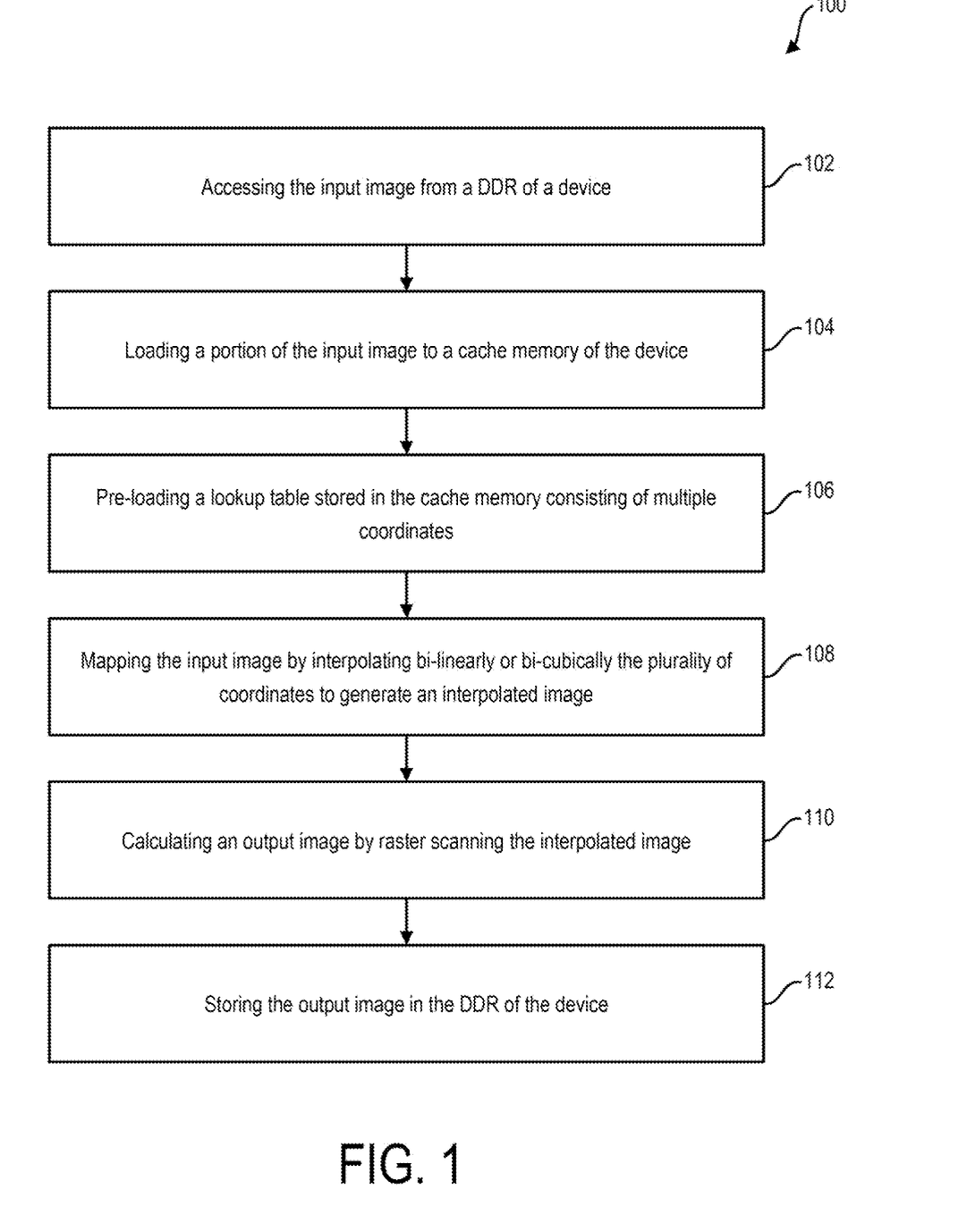
FIG. 1 illustrates a method of warping an input image using a cache based WARP engine.

FIG. 1 illustrates a method for warping an input image using a cache based WARP engine. The WARP engine performs image distortion correction, geometry transformations, panorama generation and blending of two or images together. The cache based WARP engine decreases the DDR access time and DDR bandwidth requirement along with decreasing the local SRAM requirement. Further, the engine unifies multiple image formats processing speed, making the engine processing speed independent of the image format.

The method for warping an input image using a cache based WARP engine includes accessing the input image from a DDR of a device 102. Next, the method includes loading a portion of the input image to a cache memory of the device 104. The cache memory of the device is implemented in an SRAM (Static RAM). The cache memory of the device is made up of multiple cache lines that store the input image data. The invention typically supports a 32 k bytes cache; however, the size of the cache memory is configurable. Further, the size of each cache line is configurable. Accessing the portion of the input image from the cache memory in place of the DDR decreases the local storage (SRAM) requirement. It further decreases the DDR access times and DDR bandwidth requirement.

In the next step 106, pre-loading of a lookup table stored in the cache memory with some preliminary information is done. The LUT consists of multiple coordinates of the input image. The cache lookup table consists of multiple coordinates that define information related to the input image. The image warping system may use an image lookup table to perform image warping on the original image, thereby generating a warped image. The coordinates for the output image include 2-bytes for X-coordinates and 2-bytes for Y-coordinates. In the next step, the WARP engine follows the said multiple coordinates wherein it uses the coordinates to map the input image to the output image. The cache based WARP engine of the invention would use the coordinates to map the input image to the output image. The coordinates for the output image are fixed, from left to right and from top to bottom. The engine would follow output sequence of the coordinates and look at the WARP table to determine which part of the input data engine should grab.

After following the coordinates, an interpolated image is formed using the input image by mapping the input image using the different coordinates by interpolating the input image bi-linearly or bi-cubically 108. Bilinear Interpolation includes a re-sampling method that uses the distance weighted average of the four nearest pixel values to estimate a new pixel value. The four cell centers from the input raster are closest to the cell center for the output processing cell will be weighted and based on distance and then averaged. Bi-cubic interpolation is a 2D system of using cubic splines or other polynomial technique for sharpening and enlarging digital images. In the next step, using raster scan method, an output image is calculated by the WARP engine which is ready to be displayed to a user 110. The output image can be stored in the DDR of the electronic device 112.

Figure 2:
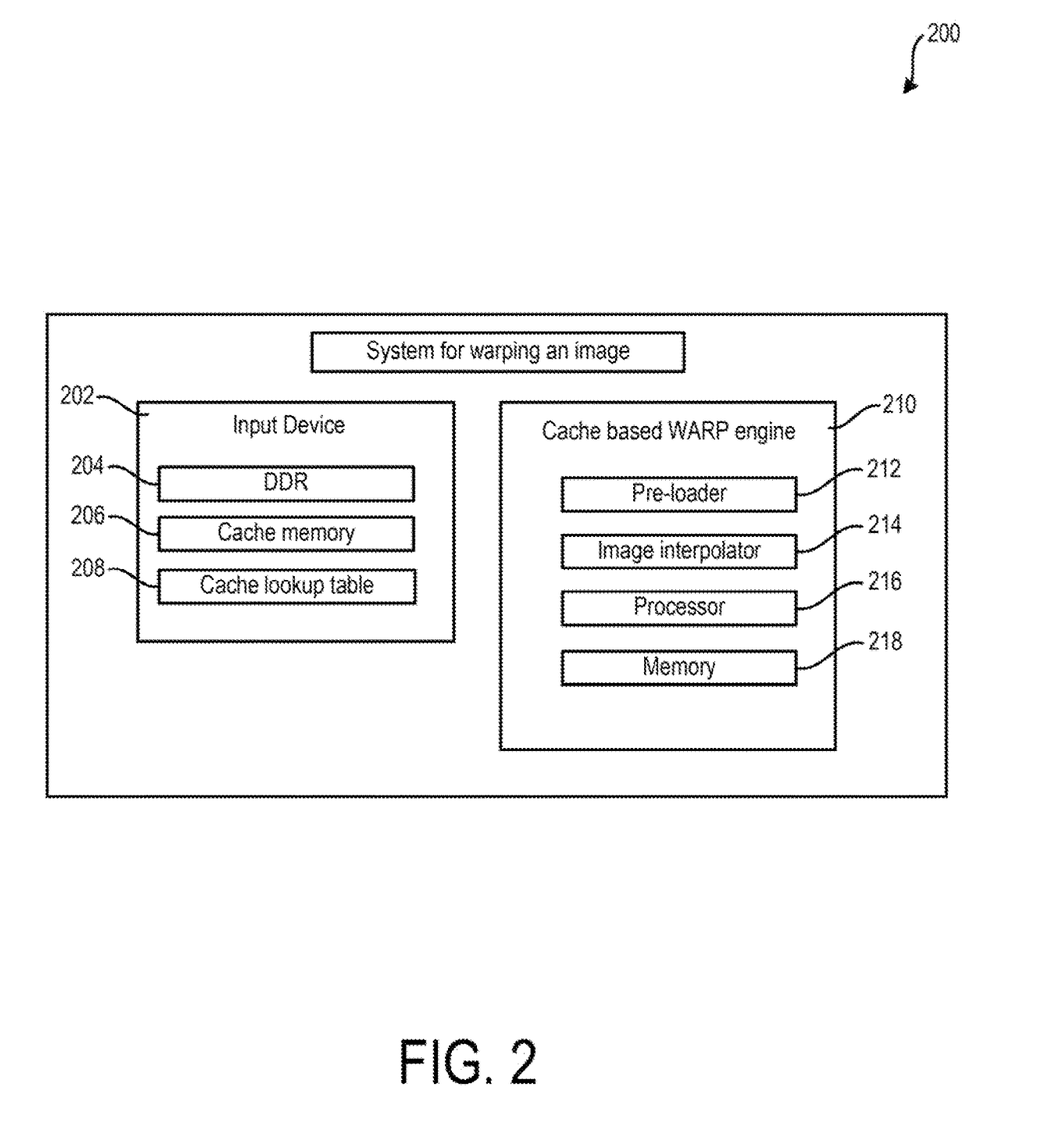
FIG. 2 illustrates a system for warping an input image in accordance with the present invention.

FIG. 2 illustrates a system for warping an input image. In one embodiment, the original image is stored in a DDR 204 of an input device 202. Double Data Rate Synchronous Dynamic Random-Access Memory, officially abbreviated as DDR SDRAM, is a double data rate (DDR) synchronous dynamic random-access memory (SDRAM) class of memory integrated circuits used in computers. In a primary embodiment, the input device 202 is a desktop computer. In alternative embodiments, the device may be a portable device (e.g., a laptop, tablet or handheld device). The device may have a touch pad and a touch-sensitive display (also referred to as a "touch screen" or "touch screen display").

The cache memory 206 of the device is implemented in an SRAM (Static RAM) to store an input image data for the cache based WARP engine 210 to access. Cache memory 206 is usually consisted of SRAM, which is more expensive but can provide much higher bandwidth compared to DDR. The cache memory 206 of the device 202 is made up of multiple cache lines that store the input image data. The invention typically supports a 32 k bytes cache, however, the size of the cache memory 206 is configurable. Further, the size of each cache line is configurable.

Cache memory 206 is a special very high-speed memory. It is used to speed up and synchronizing with high-speed CPU. Cache memory 206 is used to reduce the average time to access data from the Main memory. The cache is a smaller and faster memory which stores copies of the data from frequently used main memory locations. There are various different independent caches in a CPU, which store instructions and data. When the processor needs to read or write a location in main memory, it first checks for a corresponding entry in the cache. There are three different types of mapping used for the purpose of cache memory 206 which are as follows: Direct mapping, Associative mapping, and Set-Associative mapping.

The cache memory 206 is divided into multiple lines that store data which includes input image to be transformed to obtain an output image. The cache memory 206 of the electronic device accesses a small portion of the input image so as to speed up the engine 210 process. This enables the WARP engine 210 to access the input image directly from the cache memory 206 and not from the DDR 204. Accessing the portion of the input image from the cache memory 206 in place of the DDR decreases the local storage (SRAM) requirement. It further decreases the DDR access times and DDR bandwidth requirement.

The cache memory 206 consists of a cache LUT or a cache lookup table 208 which stores some information about the input image. The cache lookup table 208 stores input image coordinates that are utilized by a WARP engine 210 (described in subsequent paragraphs) to obtain an output image. The cache lookup table 208 is an 8×8 interval look-up table 208 containing 2 bytes for x coordinators and 2 bytes for y coordinators. The cache lookup table 208 further supports up to 4095×4095 image size. The lookup table 208 does not require a lot of storage space inside the cache memory 206. A very small cache size (few kilo-bytes) is required to store the cache lookup table 208. The cache based WARP engine 210 of the invention would use the coordinates to map the input image to the output image. The coordinates for the output image are fixed, from left to right and from top to bottom. The engine 210 would follow output sequence of the coordinates and look at the WARP table 208 to determine which part of the input data engine 210 should grab.

Further, a cache based WARP engine 210 is disclosed by the invention that performs a warping operation on the input image and provides a transformed output image with no distortions. The cache based WARP engine 210 consists of a pre-loader 212 for loading the cache lookup table with a set of coordinates. These set of coordinates are based on the coordinates of the input image. The WARP engine 210 further comprises a follower that follows the set of coordinates of the input image and an image interpolator 214. The image interpolator 214 interpolates the input image bi-linearly or bi-cubically. The interpolation method of the present invention uses a simple linear equation for obtaining interpolated pixel values so as to significantly reduce the amount of computation, thereby being advantageous to hardware implementation and reducing the cost.

The cache based WARP engine 210 of the invention is capable of supporting both bi-linear and bi-cubic interpolation techniques. Bi-cubic interpolation provides a better image quality as compared to bi-linear interpolation. The WARP engine 210 supports Lots of image format for different applications including RGB888, planar and non-planar, YUV444 and YUV422 planar and NV12. WARP Engine 210 uses same cache lines and same cache size to support these image formats. The only difference between each image format support is bandwidth requirement, different image format requires different bandwidth to achieve same frame rate. WARP engine 210 performs image distortion correction, geometry transformations, panorama generation and blending of two or images together. The cache based WARP engine 210 decreases the DDR access times and DDR bandwidth requirement along with decreasing the local SRAM requirement. Further, the engine 210 unifies multiple image format processing speed, making the engine 210 processing speed independent of the image format.

A processor 216 for calculating an output image by raster scanning the interpolated image is installed inside the cache based WARP engine. In raster Scan method, an electron beam is swept across the screen one row at a time from top to bottom. The cache based WARP engine also includes a memory element 218 for storing the output image calculated by the processor 216. The stored image is then loaded to the DDR of the electronic device.

Figure 3:
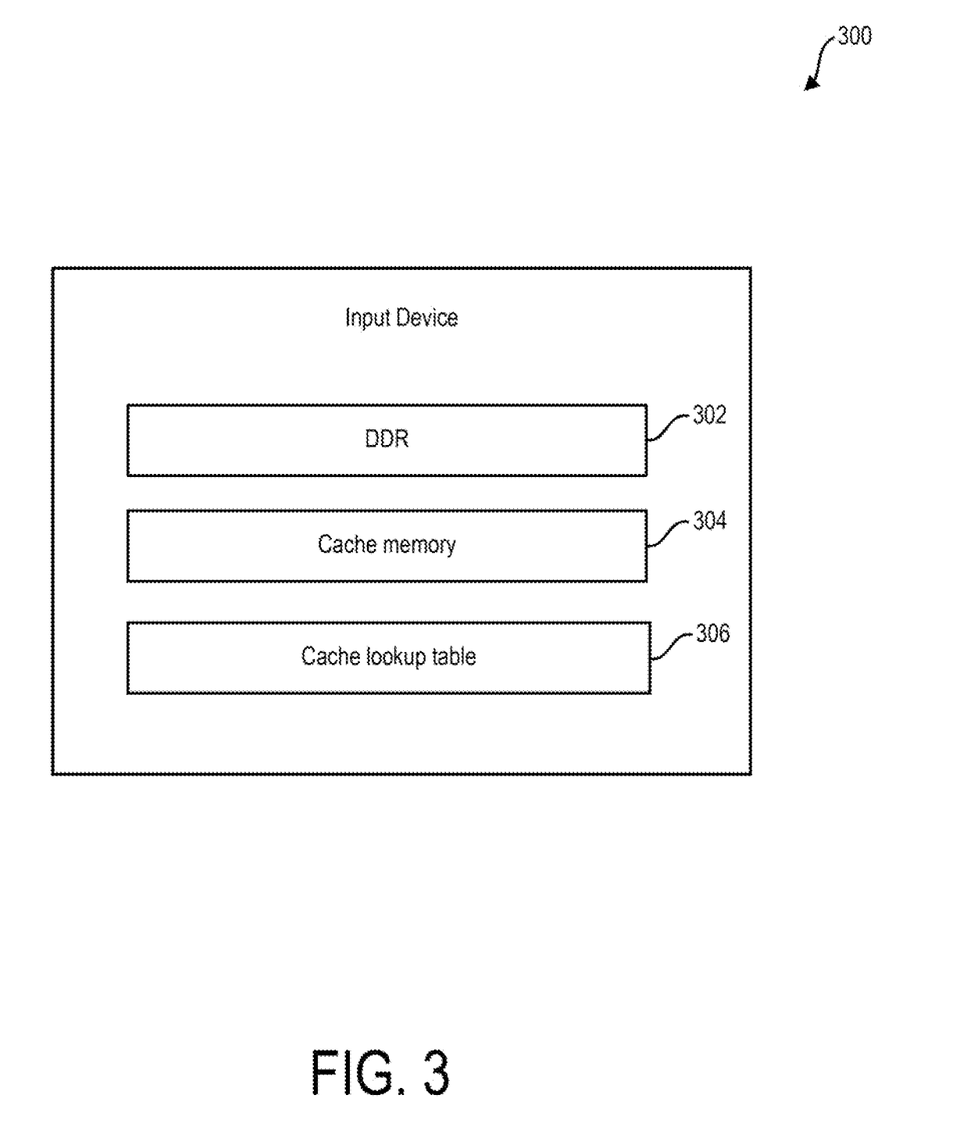
FIG. 3 illustrates an input device of the system in accordance with the present invention.

FIG. 3 illustrates an input device 300 of in accordance with the present invention 300. The warping is effected by an entity system which serves users with the system functioning between an input image and an end-user display device 300. In these contexts, the image processing/transformation and related operations can be carried out on an image display device 300. The image warping engine outputs warped image data that is provided for output to a display, such as a re-sized display, with hand-held devices and a flat-panel display (e.g., for a computer or television) shown by way of example. In a primary embodiment, the input device 300 is a desktop computer. In alternative embodiments, the device is portable (e.g., a laptop, tablet or handheld device). The device may have a touch pad and touch-sensitive display (also referred to as a "touch screen" or "touch screen display").

In addition, each of the various components may be executed in software-implemented modules, in a logic circuit, processor or computer. These software-implemented modules may be executed in part or in whole, in a hand-held device 300 such as a mobile telephone device or tablet device. In certain embodiments, aspects of these modules are carried out at a location remote to a display device 300 (e.g., such as a mobile telephone), and can be carried out based upon known screen size constraints at a hand-held device 300 to which video is streamed.

The input device 300 of the invention comprises a DDR 302 for storing the input image. In one embodiment, the original image is stored in a DDR 302 of an electronic device 300. Double Data Rate Synchronous Dynamic Random-Access Memory, officially abbreviated as DDR SDRAM, is a double data rate (DDR) synchronous dynamic random-access memory (SDRAM) class of memory integrated circuits used in computers.

The input device 300 also consists of a cache memory 304. According to the present invention, there is provided a cache memory 304 including a plurality of cache blocks and a plurality of cache blocks to be sequentially loaded in the cache memory 304. The cache memory 304 consists of a cache LUT or a cache lookup table 306 which stores some information about the input image. The cache lookup table 306 stores input image coordinates that are utilized by a WARP engine (described in subsequent paragraphs) to obtain an output image. The cache lookup table 306 is an 8×8 interval look-up table containing 2 bytes for x coordinators and 2 bytes for y coordinators. The cache lookup table 306 further supports up to 4095×4095 image size.

The lookup table 306 does not require a lot of storage space inside the cache memory 304. A very small cache size (few kilo-bytes) is required to store the cache lookup table 306. The cache based WARP engine of the invention would use the coordinates of the output image to map the input image to the output image. The coordinates for the output image are fixed, from left to right and from top to bottom. The engine would follow output sequence of the coordinates and look at the WARP table 306 to determine which part of the input data engine should grab.

Figure 4:
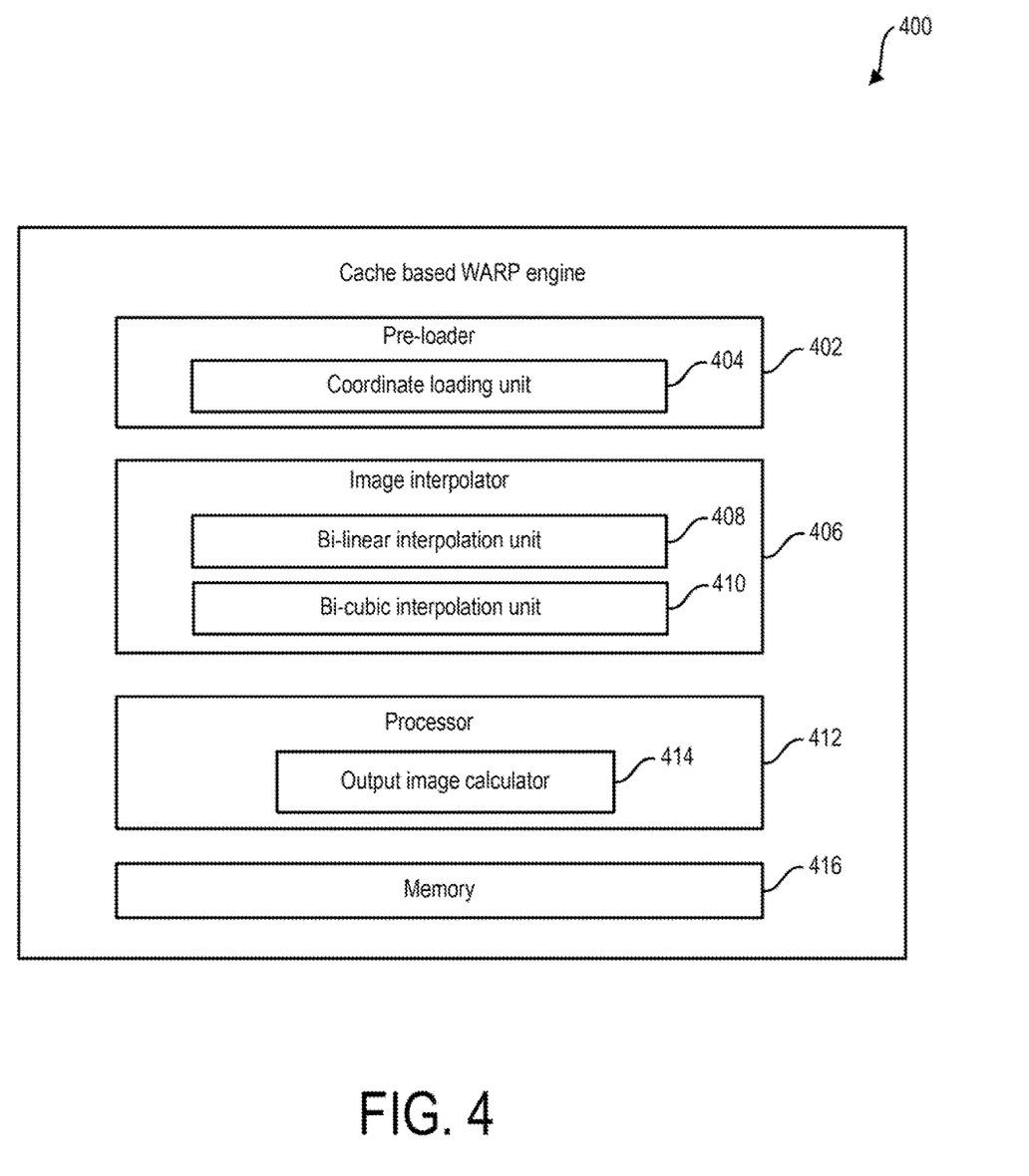
FIG. 4 illustrates a cache based WARP engine of the system in accordance with the present invention.

FIG. 4 illustrates a cache based WARP engine in accordance with the current invention. The cache based WARP engine 400 consists of a pre-loader 402 which loads the cache lookup table with a set of coordinates of the output image to be obtained based on the coordinates of the input image. The loading of coordinates is done with the help of a coordinate loading unit 404 which stores the coordinates of the input image inside the pre-loader 402. The cache based WARP engine 400 of the invention would use the coordinates of the output image to map the input image to the output image. The coordinates for the output image are fixed, from left to right and from top to bottom. The engine would follow output sequence of the coordinates and look at the WARP table to determine which part of the input data engine should grab.

The cache lookup table is an 8×8 interval look-up table containing 2 bytes for x coordinators and 2 bytes for y coordinators. The cache lookup table further supports up to 4095×4095 image size. The lookup table does not require a lot of storage space inside the cache memory. A very small cache size (few kilo-bytes) is required to store the cache lookup table.

Further, the cache based WARP engine consists of an image interpolator 406 for interpolating the input image. The cache based WARP engine supports both bi-linear and bi-cubic interpolation. For the interpolator to perform interpolation of the input image, the interpolator consists of a bi-linear interpolation unit 408 and a bi-cubic interpolation unit 410. The interpolation method of the present invention uses a simple linear equation for obtaining interpolated pixel values so as to significantly reduce the amount of computation, thereby being advantageous to hardware implementation and reducing the cost.

Bilinear Interpolation includes a re-sampling method that uses the distance weighted average of the four nearest pixel values to estimate a new pixel value. The four cell centers from the input raster are closest to the cell center for the output processing cell will be weighted and based on distance and then averaged. Bi-cubic interpolation is a 2D system of using cubic splines or other polynomial technique for sharpening and enlarging digital images. In the next step, using raster scan method, an output image is calculated by the WARP engine 400 which is ready to be displayed to a user. The output image can be stored in the DDR of the electronic device, A processor 412 consisting of an output image calculator 414 is installed inside the cache based warp engine 400 to calculate an output image after scanning the output image using a raster scan method. The engine 400 further has a memory 416 for storing the output image obtained. The memory 416 loads the output image to the DDR of the electronic device.

Figure 5:
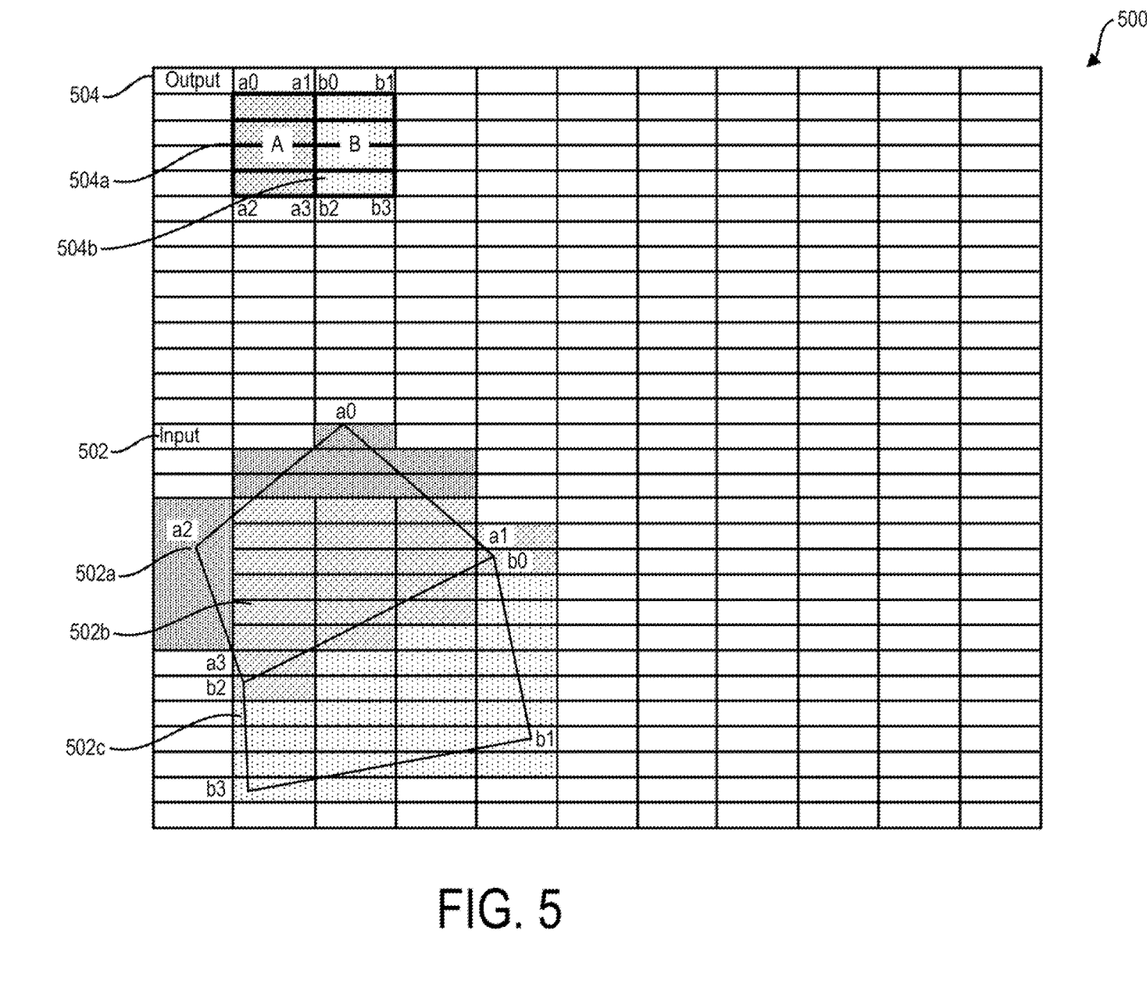
FIG. 5 illustrates coordinates of a distorted input image and a distortion-less output image in accordance with the present invention.

FIG. 5 illustrates coordinates of a distorted input image and a distortion-less output image in accordance with the present invention. A distorted input image 502 and an output image 504 with no distortions are illustrated in the FIG. 500. As shown in the figure, an input image 502 is shown in the figure which has no uniform boundary. The input image 502 has two regions marked in color green and red which are shown as distorted. The coordinates of the red region 502b of the input figure are shown as a0, a1, a2, a3. The coordinates go out of bounds and overlap with the grey region 502a in the figure which makes it distorted.

The region shown in green 502c in the input image 502 has coordinates b0, b1, b2, b3. The coordinates go out of bounds and overlap with the red region 502b in the figure which makes it distorted. To remove the distortions, the WARP engine employs the warping technique to make the boundaries of the input image 502 uniform. The pixels or the coordinates of the input image 502 which includes red 502b and green region 502c are stored in the cache lookup table inside the cache memory and are utilized during the process of image interpolation. The process of pre-loading the lookup table starts before the interpolation operation. Once all required input pixels are loaded from the DDR to the cache memory, the warp engine is set to proceed with the interpolation process.

First, the red region 502b of the input image 502 is loaded into the cache memory after which the processing of the red region starts. While the processing of the red input region 502b is going on, the green region 502c of the input image 502 is loaded into the cache memory. Once loading of green region 502c is done, the warp engine starts processing the green region 502c of the input image 502. Once all required input pixels are loaded from the DDR to the cache memory, the warp engine is set to proceed with the interpolation process. WARP would process and output 16 blocks in the first row, then 16 blocks in the second row, after process and output the first 16 blocks vertically, WARP would then process second 16 blocks horizontally in the first row. This would minimize cache size regardless of image size, distortion, and transformation types. The WARP engine supports both bi-linear and bi-cubic interpolation methods to interpolate the input image 502 and generate the output image 504.

After the process of interpolating the input image 502 by the cache based WARP engine, an output image 504 with zero distortions and with uniform boundaries throughout is obtained. As can be seen in the figure, an output image 504 with the same coordinates as that of the input image 502 is obtained. The distortions of the red region 502b and the green region 502c have been removed producing an 8×8 pixel red region 504a and an 8×8 pixel green region 504b. The 8×8 red block 504a of the output image 504 is interpolated from the red region 502b of the input image 502 and the 8×8 green block 504b of the output image 504 is interpolated from the green region 502c of the input image 502.

Figure 6A:
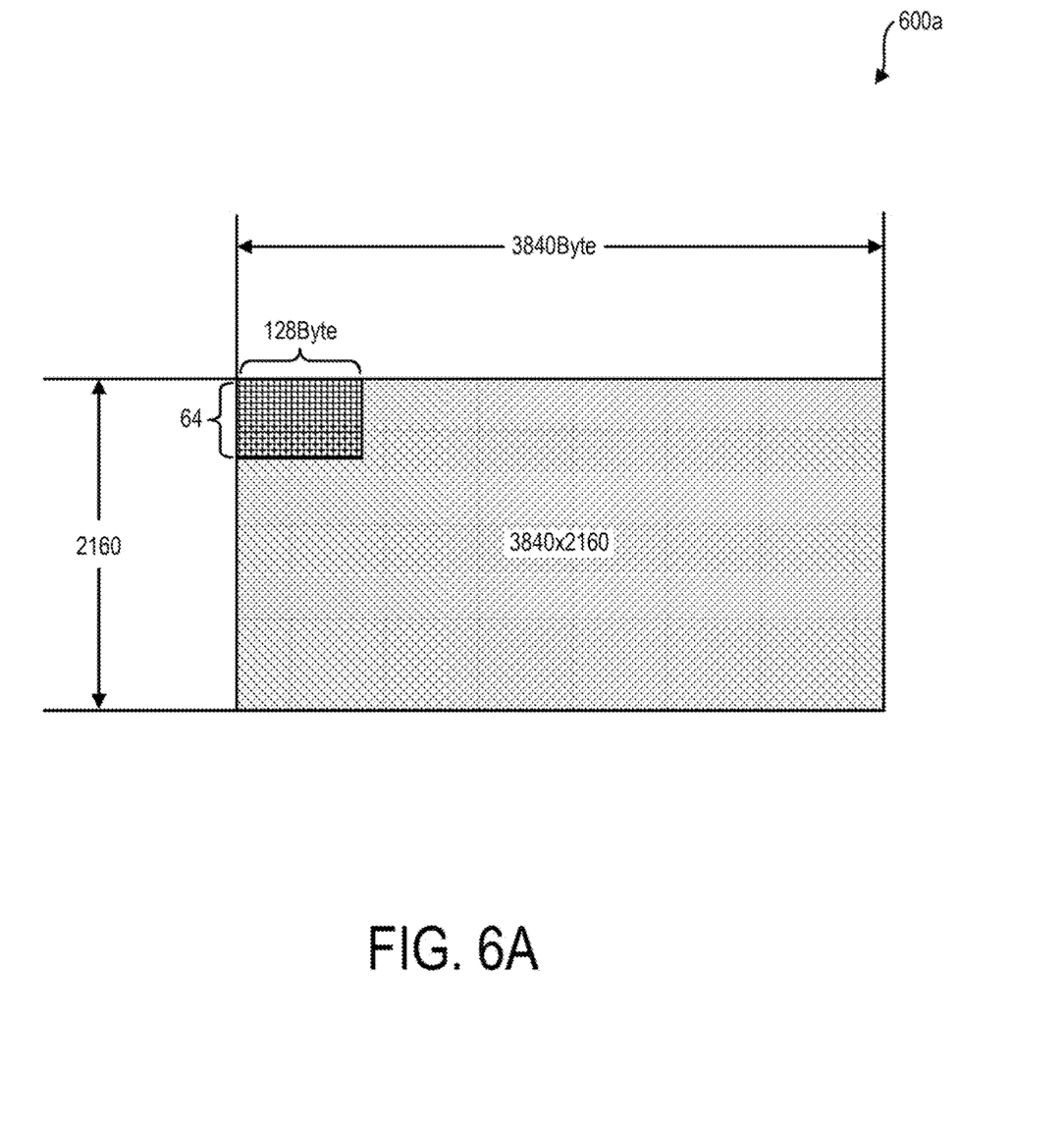
FIG. 6A illustrates a cache tag in accordance with the present invention.

FIG. 6a illustrates a cache tag in accordance with the present invention. The cache memory has two tags; a horizontal tag which depends on the cache line size and a vertical tag which depends on the number of cache lines. The tag 600a is kept to allow the cache to translate from a cache address (tag, index, and offset) to a unique CPU address. A cache hit means that the CPU tried to access an address, and a matching cache block (index, offset, and matching tag) was available in cache.

Every cache block has associated with it at least the Modify and Valid bits, and a tag address. The Valid bit says if the cache block is used (has valid data) or is unused. The Modify bit makes sense only if the Valid bit is set. The Modify bit says whether the data in the cache block is different from RAM (modified) or is the same as RAM. A tag is said to be a matching tag if, after decoding a CPU address from a pending read or write, the tag field of the CPU address matches the tag associated with a cache block at the cache address given by (index, offset).

If the cache is n-way set associative, then a cache address (index, offset) specifies not just one cache block, but a set of n cache blocks. On a read from or write to cache, if any cache block in the set has a matching tag, then it is a cache hit, and that cache block is used. If no cache block in the set has a matching tag, then it is a cache miss, and one of the cache blocks of the set is chosen for replacement. Data from that cache block is written back to RAM to make room for new data exactly as in the case of tag not matching in the state transitions.

Figure 6B:
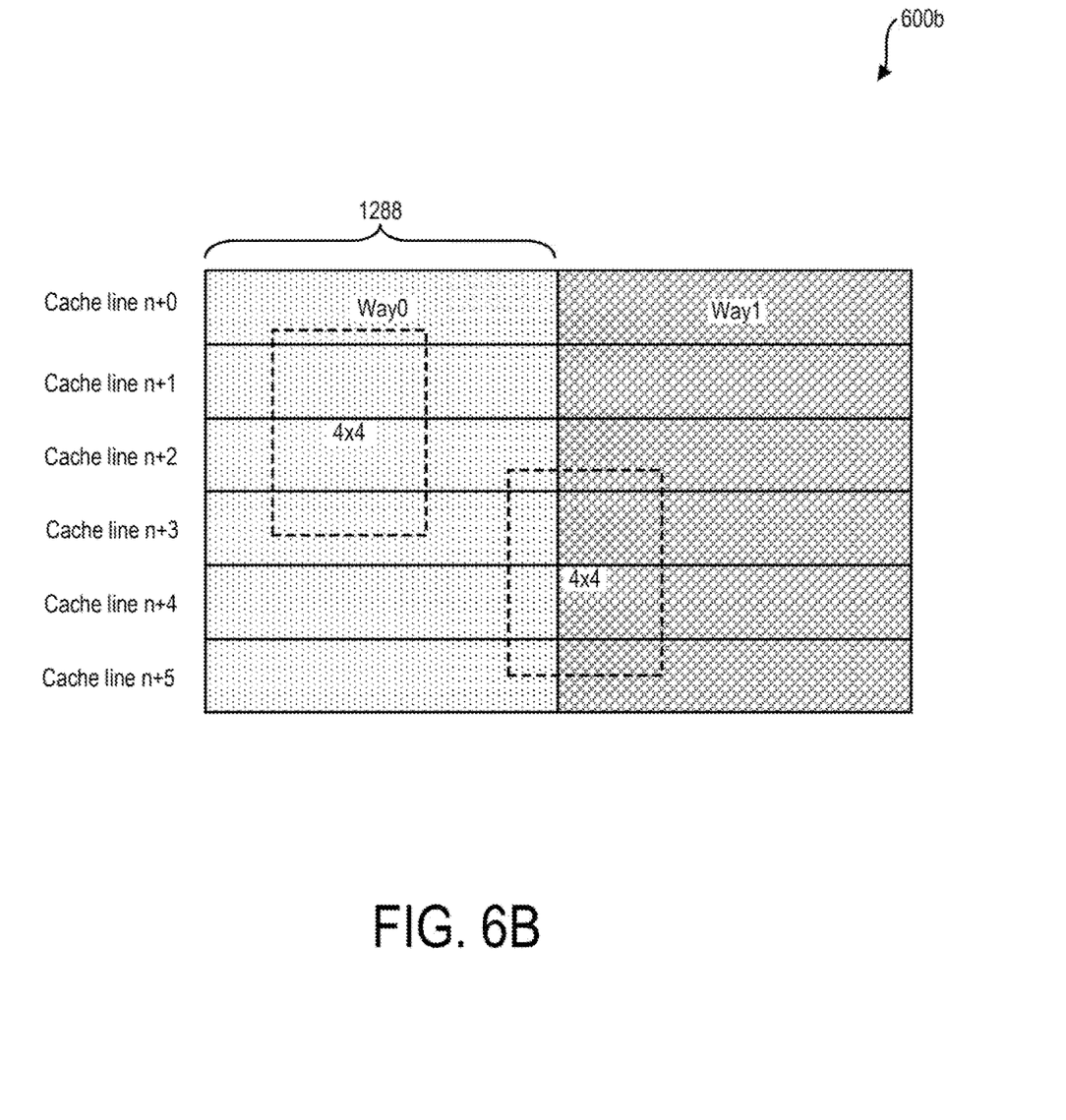
FIG. 6B illustrates a WARP cache line access in accordance with the present invention.

FIG. 6b illustrates a WARP cache line access in accordance with the present invention. The WARP engine of the invention supports both bi-cubic and bi-linear interpolation techniques. In the worst case scenario, the bi-cubic interpolation technique needs to access 8 cache lines to output 1 pixel.

In the worst case scenario for the bi-linear interpolation technique, the bi-linear interpolation technique needs to access 4 cache lines to output 1 pixel. From the statistics result, the possibility of accessing 8 caches lines in bi-cubic is around 2.4%, 4 cache lines access would be good enough for 1 pixel output/clock.

Figure 6C:
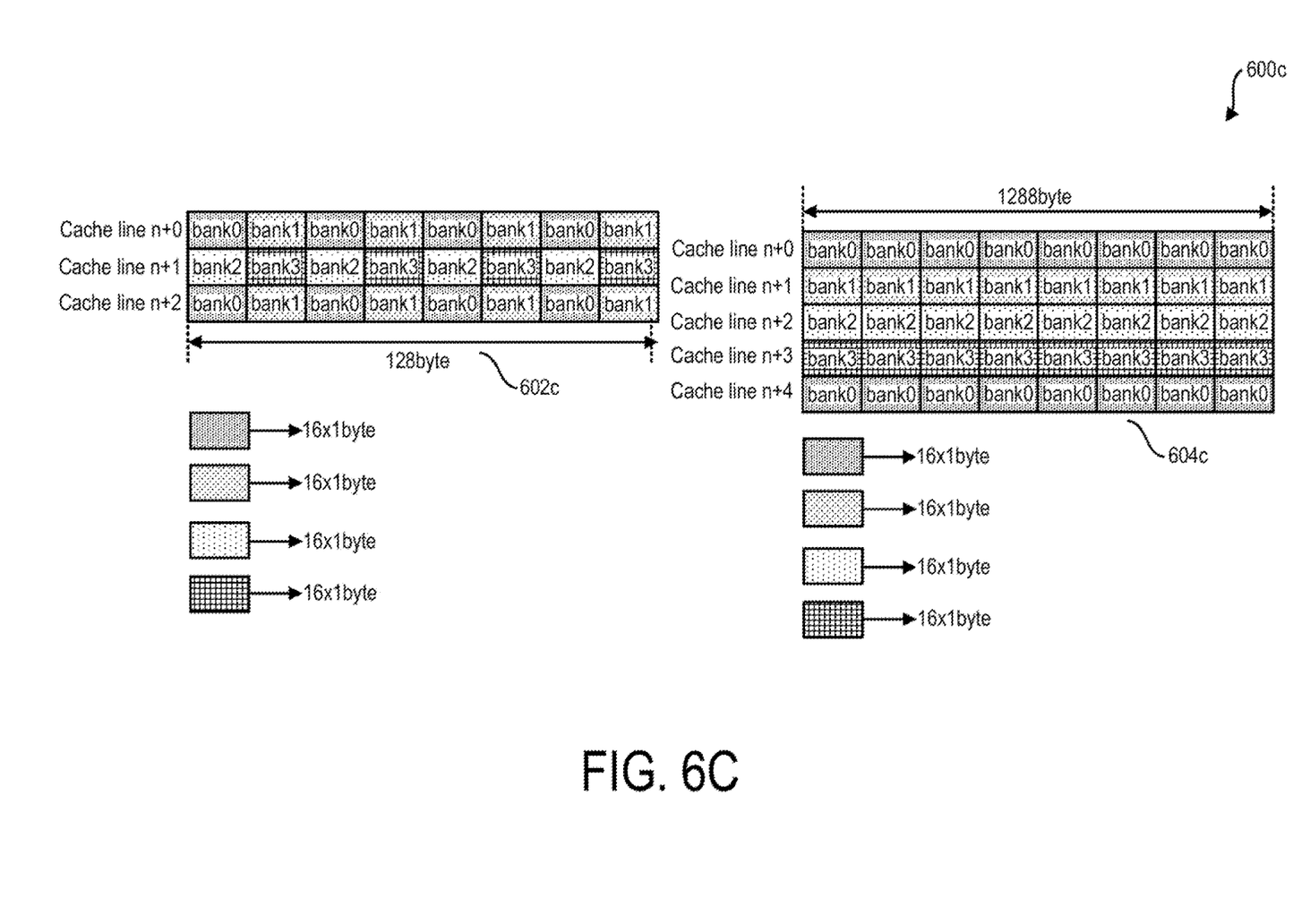
FIG. 6C illustrates a WARP cache bank for accessing cache lines in accordance with the present invention.

FIG. 6c illustrates a WARP cache bank for accessing cache lines. FIG. 6b, as shown depicts a cache bank for accessing 4 cache lines at the same time. A memory cache bank prediction unit is provided for use in a processor having a plurality of memory cache banks. The memory cache bank prediction unit has an input port that receives an instruction. The memory cache bank prediction unit also has an evaluation unit, coupled to the input port, that predicts which of the plurality of memory cache banks is associated with the instruction.

There are 4 memory banks for the entire cache memory. In the FIG. 6b, a bank organization structure for both bi-linear and bi-cubic interpolation is shown. On the left is the bank organization structure 602c for bi-linear interpolation whereas on the right is the bank organization structure 604c for bi-cubic interpolation technique.

While the various embodiments of the present invention have been described above, it should be understood that they have been presented by way of example only, and not of limitation. Likewise, the figure may depict an example architectural or other configuration for the invention, which is done to aid in understanding the features and functionality that can be included in the invention. The invention is not restricted to the illustrated example architectures or configurations, but the desired features can be implemented using a variety of alternative architecture and configurations.

Although, the invention is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

The presence of broadening words and phrases such as "one or more," "at least," "but not limited to" or other like phrases in some instances shall not be read to mean that the narrower case is intended or required in instances where such broadening phrases may be absent.

The invention claimed is:

1. A method for warping an input image using a cache based WARP engine, wherein the method comprising:
   accessing the input image from a DDR of a device;
   loading a portion of the input image to a cache memory of the device;
   pre-loading a lookup table stored in the cache memory, wherein the lookup table comprises a plurality of coordinates of the image, wherein the lookup table utilizes few kilo-bytes of the cache memory;
   applying distortion correction and perspective correction to the input image;
   mapping the input image by interpolating bi-cubically the plurality of coordinates to generate an interpolated image;
   calculating an output image by raster scanning the interpolated image; and storing the output image in the DDR of the device; and
generating an enhanced panoramic image without regard to image content by warping a panoramic digital image having skewed boundaries to fit a predetermined shape using a cache based WARP engine that is capable of supporting multiple image formats.

2. The method according to claim 1, wherein the WARP engine decreasing the DDR access time and the DDR bandwidth requirement.

3. The method according to claim 1, wherein the plurality of coordinates for the output image include 2-bytes for X-coordinates.

4. The method according to claim 1, wherein the plurality of coordinates for the output image include 2-bytes for Y-coordinates.

5. The method according to claim 1, wherein the lookup table is an 8×8 interval lookup table.

6. The method according to claim 1, wherein the lookup table supports up to 4095×4095 image size.

7. The method according to claim 1, wherein the device can be either of a tablet, a PC, a laptop, or a mobile phone.

8. The method according to claim 1, wherein cache memory includes SRAM.

9. A system for warping an input image, wherein the system comprising:
  an input device, wherein the input device comprising:
    a DDR for storing the input image;
    a cache memory with a plurality of cache lines, wherein the size of the cache memory is configurable and the plurality of cache lines access a portion of the image from the DDR;
    a cache lookup table, wherein the cache look-up table comprises a plurality of coordinates of a portion of the input image; and
  a cache based WARP engine, wherein the cache based WARP engine is capable of supporting different formats for the input image and is comprising:
    a pre-loader, wherein the pre-loader loads the cache lookup table with a set of coordinates based on the plurality of coordinates of the input image;
    an image interpolator, wherein the image interpolator interpolates the input image bi-linearly or bi-cubically to generate an interpolated image;
    a processor for calculating an output image by raster scanning the interpolated image; and
    a memory for storing the output image on the DDR.

10. The system according to claim 9, wherein the cache memory includes SRAM.

11. The system according to claim 9, wherein the cache memory includes a cache tag.

12. The system according to claim 11, further wherein the cache tag includes a horizontal tag and a vertical tag.

13. The system according to claim 11, wherein the cache based follows the sequence of coordinates.

14. A non-transitory computer readable medium storing a computer program product comprising a computer useable medium having computer program logic for enabling at least one processor in a computer system for warping an image using a cache based WARP engine, said computer program logic comprising:
  accessing the input image from a DDR of a device;
  loading a portion of the input image to a cache memory of the device;
  pre-loading a lookup table stored in the cache memory, wherein the lookup table comprises a plurality of coordinates of the image, wherein the lookup table utilizes few kilo-bytes of the cache memory;
  applying distortion correction and perspective correction to the input image;
  mapping the input image by interpolating bi-cubically the plurality of coordinates to generate an interpolated image;
  calculating an output image by raster scanning the interpolated image; and
  storing the output image in the DDR of the device; and
  generating an enhanced panoramic image without regard to image content by warping a panoramic digital image having skewed boundaries to fit a predetermined shape using a cache based WARP engine that is capable of supporting multiple image formats.

* * * * *